United States Patent [19]
Kotraba et al.

[11] Patent Number: 5,186,741
[45] Date of Patent: Feb. 16, 1993

[54] DIRECT REDUCTION PROCESS IN A ROTARY HEARTH FURNACE

[75] Inventors: Norman L. Kotraba, Tega Cay, S.C.; Carl A. Holley, Riverview, Mich.

[73] Assignee: Zia Patent Company, Dallas, Tex.

[21] Appl. No.: 684,622

[22] Filed: Apr. 12, 1991

[51] Int. Cl.$^5$ ............................................. C21B 11/08
[52] U.S. Cl. ....................................... 75/484; 75/656; 75/668; 75/695; 75/961
[58] Field of Search ................. 75/961, 484, 485, 656, 75/668, 695

[56] References Cited

U.S. PATENT DOCUMENTS

| | | | |
|---|---|---|---|
| 3,836,353 | 9/1974 | Holley | 75/961 |
| 4,251,267 | 2/1981 | Beggs et al. | 75/304 |
| 4,701,214 | 10/1987 | Kaneko et al. | 266/160 |

*Primary Examiner*—Melvyn J. Andrews
*Attorney, Agent, or Firm*—Ralph H. Dougherty

[57] ABSTRACT

The invented pellet reclamation process includes forming green pellets of a mixture of steel furnace dust, a carbonaceous material such as coal, charcoal, lignite, petroleum coke, or coke, and an organic binder. The green pellets are fed over a layer of burnt pellets on a rotary hearth furnace which successively conveys the pellets first through a drying and coking zone in which the pellets are dried and any volatile matter driven out of the carbonaceous material. The pellets then travel through a reduction zone where the pellets are subjected to a higher temperature at which the contained iron oxide is reduced and remains within the pellets and the zinc, lead and cadmium oxides are reduced, volatilized, re-oxidized and carried off as oxides in the waste gases. The reduced pellets (DRI) are ultimately carried into a discharge zone where they are discharged from the rotary hearth furnace. An apparatus for performing the process is also disclosed.

16 Claims, 4 Drawing Sheets

DIRECT REDUCTION PROCESS IN A ROTARY HEARTH FURNACE

BACKGROUND OF THE INVENTION

1. Field of the Invention

The present invention relates generally to steelmaking, and more particularly to an improved apparatus and process for recovering iron from steel mill and other metallurgical process wastes by a direct reduction process.

2. Description of Related Art

Waste materials are a natural byproduct of steelmaking and other metallurgical processes, such as the refining of nickeliferous ores. Steelmaking processes employing either a basic oxygen furnace (BOF) or an electric arc furnace (EAF) typically use large amounts of scrap, much of which is galvanized. Thus, the wastes produced include a dust containing oxides of iron as well as oxides of impurities such as zinc, lead and cadmium.

EAF dust has been declared hazardous due to the high levels of lead and cadmium oxides and must therefore be collected and reprocessed in order to protect the atmosphere and groundwater. BOF dust is expected to be declared hazardous under future environmental regulations. Because of the presence of zinc and lead oxides, attempts to reclaim the iron oxides directly for reuse have not proved to be practical.

Alternatives to direct recovery of the iron oxides have been proposed. One such proposal is to pelletize the dust and to then subject it to a very high temperature for a short period of time to sinter the pellets and to volatilize the impurities. The very high temperature partially melts the iron oxide which, when it cools, rapidly forms a glass-like material which fuses the pellets together. The resultant mass is difficult to reduce and recovery of impurities is relatively ineffective.

Holley U.S. Pat. No. 3,836,353, which issued on Sep. 17, 1974, for Pellet Reclamation Process, relates to a process for recovering iron from steel mill dust, which produces hard un-fused pellets of partially reduced iron with an iron oxide surface. The present invention relates to improvements to the invention set forth in the Holley patent.

SUMMARY OF THE INVENTION

The invented pellet reclamation process includes forming green pellets of a mixture of steel furnace dust, a carbonaceous material such as coal or coke, and an organic binder. The green pellets are fed over a layer of burnt pellets, granular limestone, or granular dolomite, on a rotary hearth furnace which successively conveys the pellets first through a drying and coking zone in which the pellets are dried and any volatile matter driven out of the carbonaceous material. The pellets then travel through a reduction zone where the pellets are subjected to a higher temperature at which the zinc, lead and cadmium oxides are reduced, volatilized, reoxidized and carried off as oxides. The pellets are ultimately carried into a discharge zone from which they are discharged from the rotary hearth furnace.

The invented process is particularly useful in that it produces hard, un-fused pellets of reduced iron. The process effectively removes metallic impurities and recovers the impurities as oxides. Particularly, the process removes substantially all of the zinc, lead and cadmium from the dust and collects the same as zinc oxide, lead oxide and cadmium oxide. The process efficiently recovers what was formerly waste material and eliminates groundwater contamination by completely recycling all the waste material as usable commercial commodities. Thus, there is no residual solid or liquid waste that requires disposal. An apparatus for performing the process is also disclosed.

OBJECTS OF THE INVENTION

The principal object of the invention is to provide an improved direct reduction process and apparatus for recovering iron units from metallurgical plant wastes.

Another object of the invention is to provide a method and apparatus for recovering iron units from steel mill dust in the form of hard, un-fused pellets of iron.

Another object of the invention is to provide an apparatus for, and a method of, removing impurities such as zinc, lead and cadmium from metallurgical wastes, and recovering such metals in the form of oxides thereof.

A further object of the invention is to provide an apparatus for, and a method of, reclaiming valuable components from waste in the steelmaking process.

It is also an object of the invention to provide means for reducing contamination of groundwater by treatment of metal-containing hazardous wastes.

BRIEF DESCRIPTION OF THE DRAWINGS

The foregoing and other objects will become more readily apparent by referring to the following detailed description and the appended drawings, in which.

DETAILED DESCRIPTION

Figure 1:
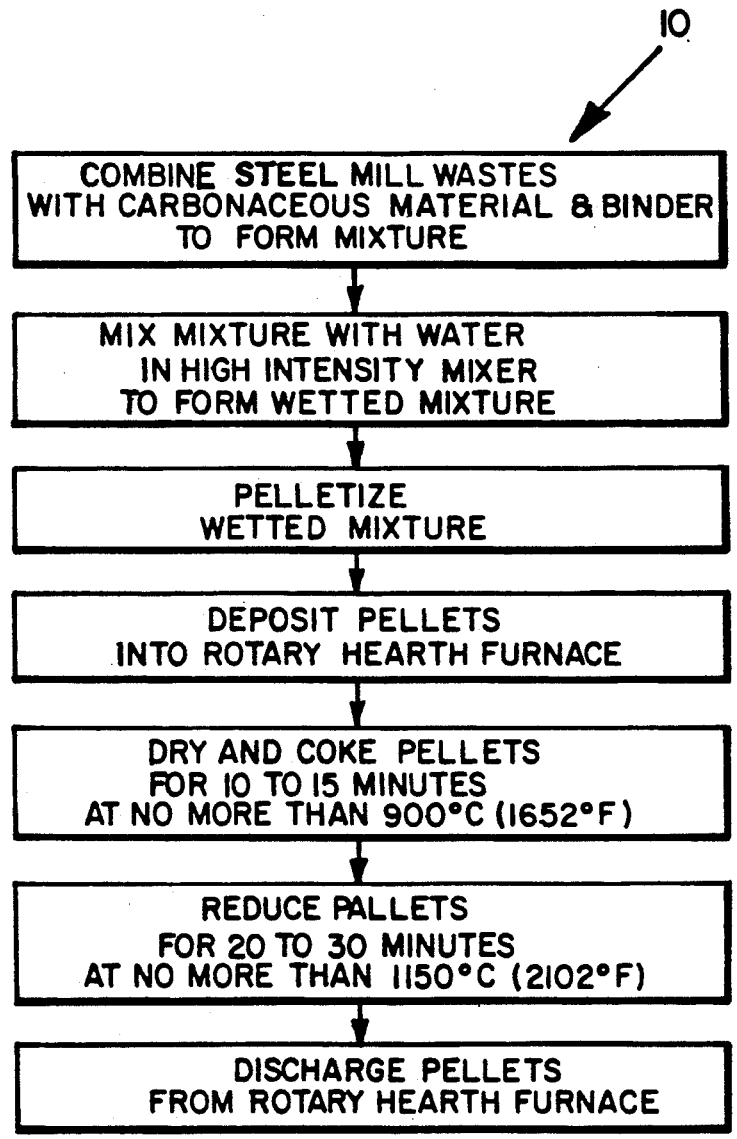
FIG. 1 is a block diagram illustrating the various steps which are performed during the invented direct reduction process.

Referring now to the drawings, the block diagram of FIG. 1 illustrates the steps of the invented direct reduction process 10.

Figure 2:
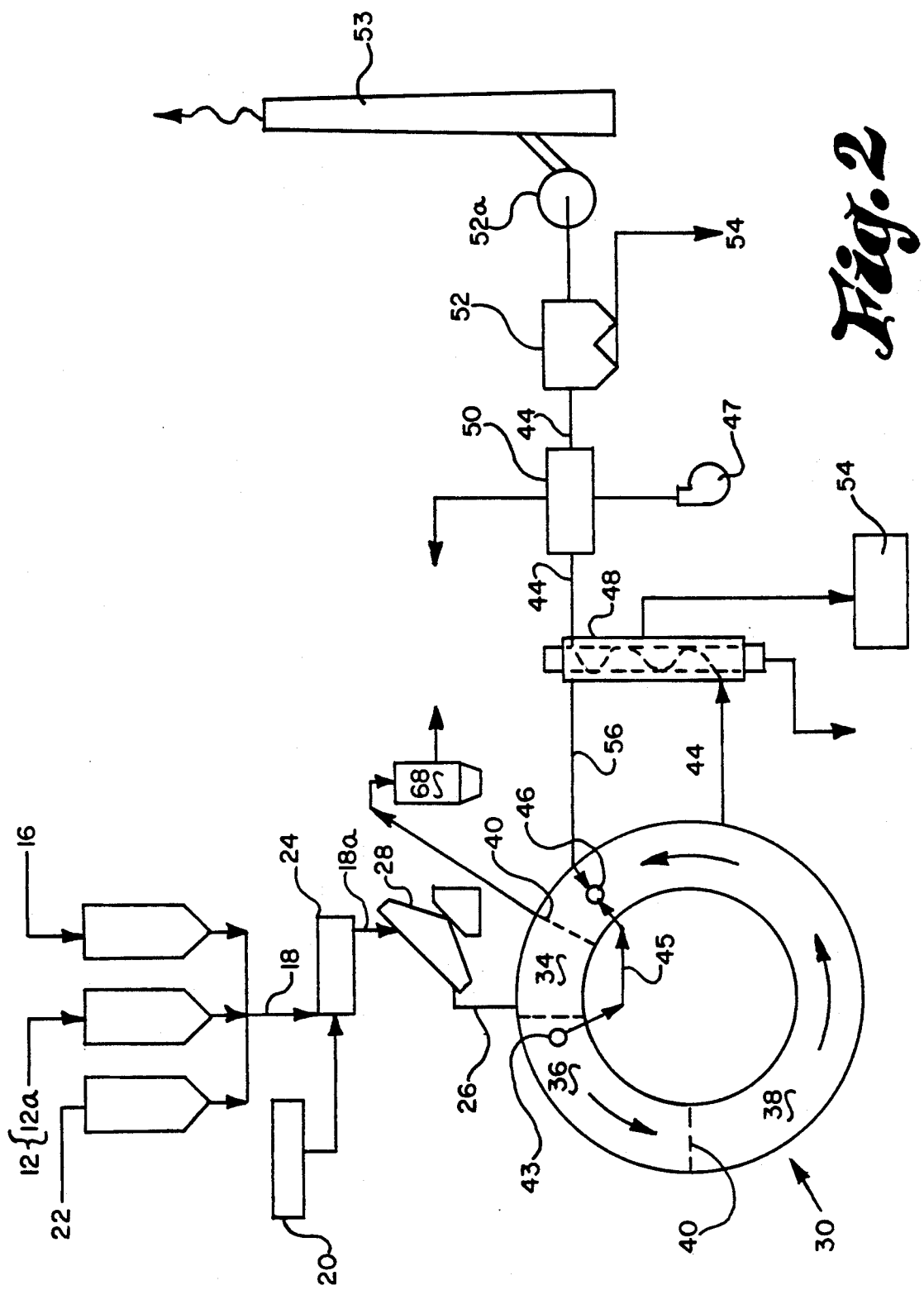
FIG. 2 is a diagram schematically illustrating the apparatus employed in the process.
Figure 3:
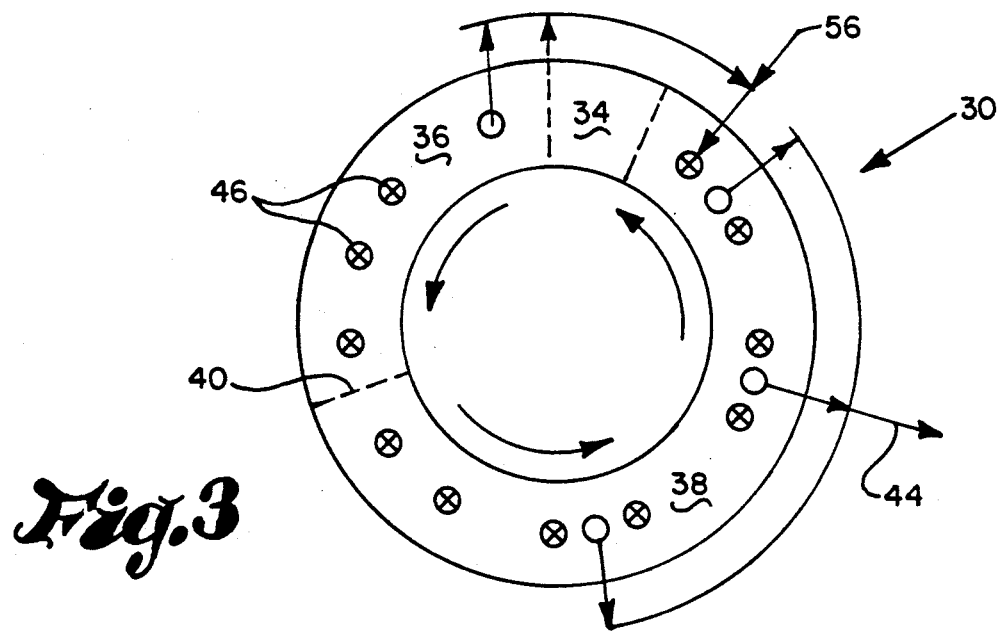
FIG. 3 is a schematic plan view of a rotary hearth furnace illustrating the various zones within the furnace, and mechanism for recirculating waste gas from the drying/coking zone into the latter stage of the reduction zone.

As best shown in FIG. 2, steel mill wastes 12, such as EAF dust, BOF dust, rolling mill scale, or the like, are collected as the result of normal steel mill operations. The steel mill wastes 12, which contain metallic oxides, are combined with a finely divided (pulverized) carbonaceous material 16, such as coke, coke breeze, or coal, and an organic binder 22, to form a mixture 18, as illustrated in block 100. The carbonaceous material 16 serves as a reductant for the metallic oxides. The organic binder 22 facilitates increased pellet strength.

Water 20 is added to and mixed with mixture 18 in a mixer 24 to form a wetted mixture 18a, as illustrated in block 110. The use of a high intensity mixer 24 ensures proper blending and wetting of the material for subsequent pelletizing. The preferred high intensity mixer 24 is a Ferro-Tech-Turbulator TM (as described in U.S. Pat. No. 4,881,887), although any of a number of other mixers could be employed. Use of a high intensity mixer 24 minimizes time and temperature during the drying-/coking stage, discussed below. The amount of water 20 introduced during this wet mixing stage is regulated to ensure proper consistency of the mixture 18 for subsequent pelletizing.

Block 120 illustrates the pelletizing of the wetted mixture 18a, that is, forming of the mixture into green pellets 26. The wetted mixture 18a is agglomerated in a pelletizer 28 to form green pellets 26 approximately 12 to 15 mm in diameter. The preferred pelletizer 28 is a shallow pan disc pelletizer, such as shown in U.S. Pat. Nos. 3,883,281 and 4,726,755, which results in very dense and consistently durable pellets 26. The preferred depth of the shallow pan varies exponentially with the pan diameter. The preferred depth (d), in inches, is the pan diameter (D), in inches, raised to the 0.58 power, namely, $d = D^{0.58}$. Alternatively, other pelletizing devices, such as a drum or cone pelletizer may be employed.

The green pellets 26 are deposited into a rotary hearth furnace 30. See Block 130. The rotary hearth furnace 30 has a horizontal turntable or hearth 32 mounted for rotary movement about its center. The furnace is divided into three separate and distinct zones: a charging/discharging zone 34, occupying approximately 10% of the hearth area; a drying/coking zone 36, occupying approximately 25% of the hearth area; and a reduction zone 38, occupying approximately 65% of the hearth area. Each zone is separated from an adjacent zone by a barrier curtain 40 which is constructed of an alloy suitable to withstand high temperatures and corrosive atmospheres within the zones (e.g., HR160 alloy, available from Haynes International). The curtain 40 spans the distance between the side walls 30a of the rotary hearth furnace 30 and is suspended from the roof 30b of the rotary hearth furnace 30. The curtains 40 preserve the desired atmosphere within the various zones. However, since the reduction reactions take place primarily within the individual pellets 26, furnace atmosphere control is not critical. The bottom edge 40a of the curtain 40 is positioned slightly above the hearth 32 for maintaining a uniform pellet bed depth.

Initially, the rotary hearth furnace 30 is charged with a layer of green pellets 26 which are allowed to burn, thereby creating a layer 42 of burnt pellets 42a. Alternatively, the hearth layer 42 may comprise suitable loose materials such as lime (CaO), metal oxide powder, or coke. In any case, the hearth layer 42 is intended to keep pellets 26 traveling through the rotary hearth furnace 30 from sticking to the hearth 32. Additional green pellets 26 are then charged into the charging/discharge zone 34 directly onto the layer 42 of burnt pellets within the rotary hearth furnace 30. See Block 140. Preferably, the additional green pellets 26 are uniformly distributed onto the layer 42 of burnt pellets 42a no more than 3 to 4 green pellets 26 in thickness. The zones of the rotary hearth furnace 30 are fired as necessary to maintain a temperature less than that at which the green pellets 26 will tend to fuse together, and in a manner to create a reducing atmosphere necessary to prevent re-oxidation of the green pellets 26 (i.e., below about 1150° C. (2102° F.)).

The green pellets 26 are then transported to the drying/coking zone 36 and dried and coked for 10 to 15 minutes at no more than 900° C. (1652° F.), as illustrated in Block 150. Preferably, the green pellets 26 are dried and coked for 10 to 15 minutes at 600° to 700° C. (1112° to 1292° F.). Waste gas 45 created in the drying/coking zone 36 consists essentially of the moisture driven from the drying green pellets 26 and volatile matter from the coking of the carbonaceous material 16. Any volatile matter can have significant heating value. To utilize this potential energy, the waste gas 45 stream is removed through offtake 43 and introduced into the latter stage of the reduction zone 38 through an air-gas burner 46 and combustion takes place within the reduction zone 38.

The green pellets 26 are transported from the drying/coking zone 36 to the reduction zone 38 and reduced for 20 to 30 minutes at no more than 1150° C. (2102° F.), preferably at 1000° to 1100° C. (1832° to 2012° F.). See Block 160. Reduction of the metallic oxides takes place within each green pellet 26. At this temperature range, the carbon 16c contained in the carbonaceous material 16 within the green pellets 26 reacts with iron, zinc, lead and cadmium oxides forming the respective elemental metals and carbon monoxide. The hot carbon monoxide can also react with any remaining unreacted iron, zinc, lead and cadmium oxides within the pellets 26, reducing them and forming CO2. The metallic zinc, lead and cadmium boil off as vapors and are re-oxidized in the atmosphere over the pellet bed. This re-oxidation releases considerable energy which may also be used to drive the reduction process within the furnace 30.

Hot waste gases 44 leaving the reduction zone 38 of rotary hearth furnace 30 are routed around a vertical retort 48 and then into a heat exchanger 50, thereby reclaiming heat value. The waste gases 44 contain zinc, lead and cadmium oxides. Combustion air 47 used in firing air-gas burners 46 is preheated with the heat exchanger 50. This considerably reduces the amount of fuel gas needed to operate the process. Passage of waste gases through the heat exchanger 50 reduces the waste gas temperature to a level acceptable to a fabric type dust collector or bag house 52. The clean dedusted gas passes through fan 52a and stack 53 to the atmosphere. The zinc, lead and cadmium oxides are removed and delivered to a vertical retort operation 54 for conversion into metallic state and casting.

The vertical retort 48 is externally heated by passing the waste gases 44 from the furnace 30 around the vertical retort 48 before the waste gases 44 are introduced to the heat exchanger 50. The top gas 56 from the retort 48 is similar to the waste gas 45 from the drying/coking zone 36 of the rotary hearth furnace 30 in that it contains the moisture from the drying secondarily formed oxide pellets and any volatile matter driven from the carbonaceous reductant used in conjunction with the secondarily formed oxide pellets.

Figure 4:
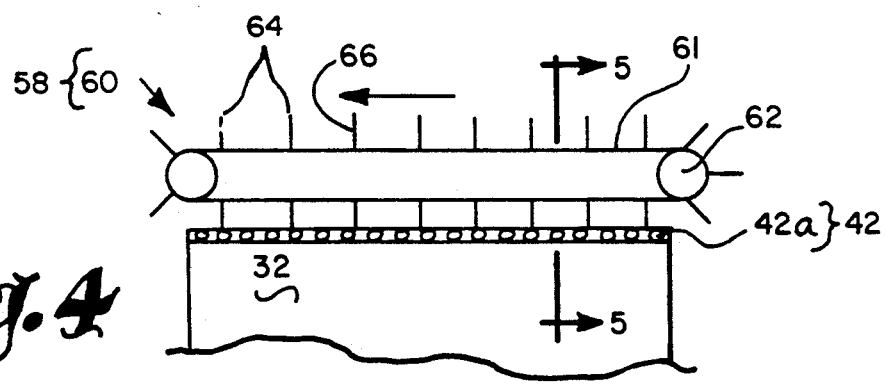
FIG. 4 is a sectional side view of a drag conveyor for removing reduced pellets from the rotary hearth furnace.
Figure 5:
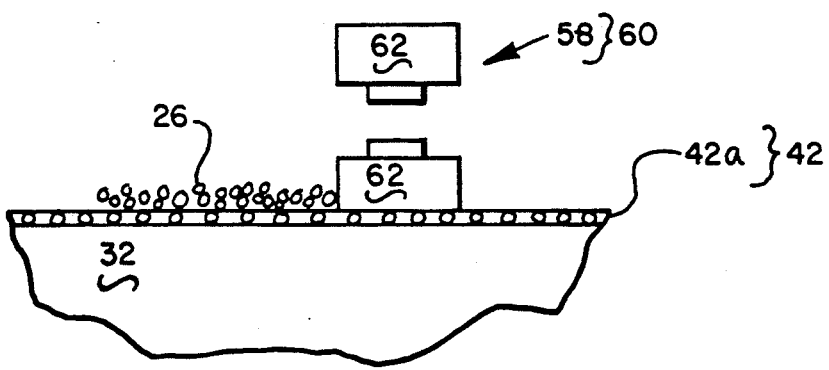
FIG. 5 is a vertical sectional view taken along line 5—5 of FIG. 4 of a drag conveyor for removing pellets from the rotary hearth furnace.
Figure 6:
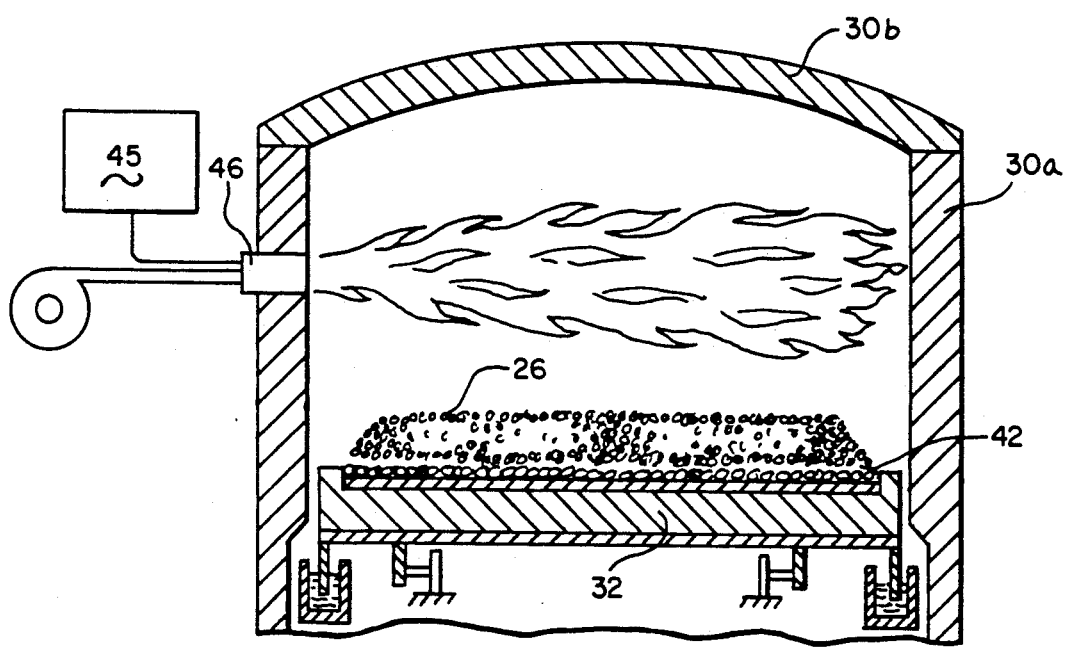
FIG. 6 is a partial vertical sectional view of the rotary hearth furnace of FIG. 3.

As illustrated in Block 160, the reduced pellets are then discharged from the discharge zone 34 of the rotary hearth furnace 30, preferably at a temperature of approximately 1100° C. (2012° F.). An advantageous removal means 58 illustrated in FIGS. 4 and 5 includes a drag conveyor 60 having a belt or chain 61 passing around driven sprokets or rollers 62. Paddles 64 are provided with a wear surface 66 affixed (e.g., bolted) to the front of each paddle 64. The paddles 64 are preferably made of steel and the wear surface 64 is preferably made of HR160 alloy, or a refractory such as Monofrax produced by Carborundum Company.

The reduced iron remains in the pellets 26 throughout their passage through the zones of the rotary hearth furnace 30 along with the normal non-reducing oxide materials in the steel mill wastes 12. The reduced pellets contain all the iron units introduced with the mill waste 12 (e.g., dust, scale, etc.,) and virtually all the iron oxide is reduced to the metallic state. Reduced pellets such as this are known in the steel industry as direct reduced iron (DRI) and are a desirable source of iron units for the steel industry.

A unique feature of the invention is that the DRI pellets produced can contain a significant amount of carbon (up to 12% by weight) as they are discharged from the rotary hearth furnace 30 at approximately 1100° C. (2012° F.). DRI pellets made by other known processes cannot contain carbon in a hot state. Carbon is added to these DRI pellets during the cooling process and only up to about 2 to 3 percent.

If desired, the DRI pellets may be discharged from the rotary hearth furnace 30 directly into refractory lined, insulated and sealed containers 68 which exclude ambient air. Exposure of hot DRI to air (oxygen) allows rapid re-oxidation of the metallic iron to iron oxide. The sealed containers 68, which contain iron pellets that rae nearly oxide-free, may then be transported directly to the steelmaking operation, thereby conserving the energy normally associated with raising the DRI pellets to the desired temperature prior to melting and refining. The material will already be at least 1000° C. (1832° F.). Melting and refining of the DRI pellets can then take place using existing oxygen melting and refining technologies without the need to inject a carbon fuel to provide the heat needed for melting and refining. Thus, the DRI pellets are provided to a steelmaking operation well-preheated, with self-contained fuel for processing.

SUMMARY OF THE ACHIEVEMENT OF THE OBJECTS OF THE INVENTION

From the foregoing, it is readily apparent that we have invented an improved method for recovering iron from steel mill wastes by a direct reduction process, in the form of hard, un-fused pellets of iron, which removes and recovers impurities such as zinc, lead and cadmium in the form of oxides or metals, and which reclaims what formerly was waste in the steelmaking process, while at the same time reducing contamination of groundwater.

It is to be understood that the foregoing description and specific embodiments are merely illustrative of the best mode of the invention and the principles thereof, and that various modifications and additions may be made to the method by those skilled in the art, without departing from the spirit and scope of this invention, which is therefore understood to be limited only by the scope of the appended claims.

We claim:
1. A method of recovering iron from iron-bearing steel mill wastes comprising the steps of:
  (a) combining steel mill wastes, having metallic oxides including iron oxides therein, with carbonaceous material and an organic binder to form a mixture;
  (b) mixing said mixture with water to form a wetted mixture;
  (c) pelletizing said wetted mixture to form green pellets;
  (d) charging said green pellets into a rotary hearth furnace;
  (e) drying and coking said green pellets for 10 to 15 minutes at a temperature no higher than 900° C. (1652° F.) to form dried pellets;
  (f) reducing said dried pellets for 20 to 30 minutes at a temperature no higher than 1150° C. (2102° F.) to form reduced pellets; and
  (g) discharging said reduced pellets from said rotary hearth furnace;
  wherein:
    the charging step (d) and the discharging step (g) occupy about 10% of the total time the pellets remain within the rotary hearth furnace;
    the drying and coking step (e) occupies approximately 25% of the total time the pellets remain within the rotary hearth furnace, and
    the reducing step (f) occupies approximately 65% of the total time the pellets remain within the rotary hearth furnace.

2. The method of recovering iron from wastes according to claim 1, wherein said steel mill wastes are selected from the group consisting of mill scale, electric arc furnace dust, and basic oxygen furnace dust.

3. The method of recovering iron from wastes according to claim 1, wherein said carbonaceous material is selected from the group consisting of coal, lignite, charcoal, petroleum code, coke, and coke breeze.

4. The method according to claim 3, wherein said carbonaceous material is finely pulverized and serves as a reductant for the metallic oxides.

5. The method of recovering iron from wastes according to claim 1, wherein said mixing is performed by a high intensity mixer.

6. The method of recovering iron from wastes according to claim 1, wherein said pelletizing step (c) includes dropping said wetted mixture onto a pelletizing disc and forming green pellets approximately 12 to 15 mm in diameter.

7. The method of recovering iron from steel mill wastes according to claim 1, wherein the charging step (d) includes initially depositing a layer of green pellets onto the hearth of said furnace, and allowing said green pellets to burn, thereby creating a layer of burnt pellets as a protective layer on said hearth.

8. The method of recovering iron from steel mill wastes according to claim 7, further comprising the steps of charging additional green pellets directly onto said layer of burnt pellets within said rotary hearth furnace, said additional green pellets being uniformly distributed onto said layer of burnt pellets no more than 3 to 4 green pellets in thickness.

9. The method of recovering iron from wastes according to claim 1, wherein step (d) includes firing said furnace zones at a temperature less than the temperature at which said pellets will tend to soften and fuse together, and creating a reducing atmosphere to prevent re-oxidation of said pellets.

10. The method of recovering iron from wastes according to claim 1, wherein step (e) includes drying and coking said pellets for about 10 to 15 minutes at a temperature of about 600° to 700° C. (1112° to 1292° F.).

11. The method of recovering iron from wastes according to claim 1, wherein step (f) includes reducing said pellets for about 20 to 30 minutes at a temperature of about 1000° to 1100° C. (1832° to 2012° F.).

12. The method of recovering iron from wastes according to claim 1, further comprising reclaiming heat value of hot waste gases leaving said rotary hearth furnace as waste top gases by passing the hot waste gases around a vertical retort and then through a heat exchanger.

13. The method of recovering iron from wastes according to claim 1, wherein said reduced pellets are discharged from said rotary hearth furnace at approximately 1100° C. (2012° F.).

14. The method of recovering iron from wastes according to claim 1, further comprising, adding excess carbon to said pellets during step (a) in excess of the amount required for reduction wherein excess carbon remains in said reduced pellets discharged from said furnace.

15. The method of recovering iron from wastes according to claim 1, further comprising:
discharging said reduced pellets from said rotary hearth furnace at temperature of at least 900° C. directly into a refractory lined, insulated and sealed container, and excluding ambient air therefrom;
transporting said reduced pellets in said sealed container directly to a steelmaking operation; and
melting and refining said reduced pellets to form molten steel, whereby at least part of the carbon fuel required to provide the heat needed for melting and refining is contained within said reduced pellets.

16. The method of recovering iron from wastes generated from metallurgical processing of iron-containing materials, comprising the steps of:
(a) combining wastes, having iron and other metallic oxides, including at least one oxide from the group consisting of zinc, lead and cadmium oxides, therein, with carbonaceous material and an organic binder to form a mixture;
(b) mixing said mixture with water to form a wetted mixture;
(c) pelletizing said wetted mixture to form green pellets;
(d) charging said green pellets into a rotary hearth furnace;
(e) drying and coking said green pellets for 10 to 15 minutes at a temperature no higher than 900° C. (1652° F.) to form dried pellets;
(f) reducing said dried pellets for 20 to 30 minutes at a temperature no higher than 1150° C. (2102° F.) to form reduced pellets;
(g) discharging said reduced pellets from said rotary hearth furnace:
(h) reclaiming heat value of hot waste gases leaving said rotary hearth furnace as waste top gases by passing the hot waste gases around a vertical retort and then through a heat exchanger;
(i) wherein said rotary hearth furnace is provided with air-gas burners therein, and said waste top gases contain at least one oxide from the group consisting of zinc, lead and cadmium oxides, the method further comprising the steps of:
preheating combustion air for firing the air-gas burners by passing combustion air through the heat exchanger;
introducing said waste top gases from the vertical retort to the reduction zone of said rotary hearth furnace;
removing said oxides from said rotary hearth furnace; and
reducing said oxides to a metallic state.

* * * * *